(12) United States Patent
Grandbois

(10) Patent No.: US 8,974,752 B2
(45) Date of Patent: Mar. 10, 2015

(54) PROCESS FOR TREATING CRUSTY SNO

(71) Applicant: Dow Global Technologies LLC, Midland, MI (US)

(72) Inventor: Matthew L. Grandbois, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 208 days.

(21) Appl. No.: 13/632,012

(22) Filed: Sep. 30, 2012

(65) Prior Publication Data

US 2013/0108512 A1 May 2, 2013

Related U.S. Application Data

(60) Provisional application No. 61/553,759, filed on Oct. 31, 2011.

(51) Int. Cl.
*C01G 19/00* (2006.01)
*C01G 19/02* (2006.01)

(52) U.S. Cl.
CPC ............ *C01G 19/02* (2013.01); *C01P 2002/70* (2013.01); *C01P 2002/85* (2013.01); *C01P 2004/84* (2013.01)
USPC ............ 423/90; 423/618; 106/1.05; 205/252; 205/300; 205/241; 428/35.3; 428/35.8

(58) Field of Classification Search
None
See application file for complete search history.

(56) References Cited

U.S. PATENT DOCUMENTS

| 4,871,429 A | 10/1989 | Nobel et al. | |
|---|---|---|---|
| 7,465,384 B2 * | 12/2008 | Levey et al. | 205/140 |
| 2010/0116674 A1 * | 5/2010 | Luo et al. | 205/101 |
| 2013/0084240 A1 | 4/2013 | Grandbois | |
| 2013/0084414 A1 | 4/2013 | Grandbois | |

FOREIGN PATENT DOCUMENTS

| CN | 101367543 A | 2/2009 |
|---|---|---|
| CN | 101530797 A | 9/2009 |
| CN | 101665266 A | 3/2010 |
| EP | 1 696 052 A2 | 8/2006 |
| JP | 60-221319 | 11/1985 |
| JP | 01051330 A | 2/1989 |
| JP | 03223112 A | 10/1991 |
| JP | 11-310415 | 4/1998 |
| JP | 2007-302496 | 11/2007 |
| JP | 2009-132570 | 11/2007 |
| JP | 2009-132571 | 11/2007 |

OTHER PUBLICATIONS

Schryer et al, "Effects of pretreatment conditions on a Pt/SnO$_2$ catalyst for the oxidation of CO in CO$_2$ lasers", Journal of Catalysis, 1990, pp. 193-197, vol. 122.

Charvin et al, "Experimental study of SnO$_2$/SnO/Sn thermochemical systems for solar production of hydrogen", AIChE Journal, 2008, pp. 2759-2767, vol. 54, No. 10.

Drawdy et al, "Effect of pretreatment on a platinized tin oxide catalyst used for low-temperature CO oxidation", Surface and Interface Analysis, 1990, pp. 369-374, vol. 16.

European Search Report of corresponding European Application No. 12 18 6655, Feb. 2013.

* cited by examiner

*Primary Examiner* — Steven Bos
(74) *Attorney, Agent, or Firm* — S. Matthew Cairns

(57) ABSTRACT

Methods of treating of stannous oxide particles having at least a partial surface crust of stannic oxide by contacting the particles with a reducing agent for a period of time sufficient to produce stannous oxide are provided. The stannous oxide particles produced are readily soluble in organic sulfonic acids.

18 Claims, 2 Drawing Sheets

PROCESS FOR TREATING CRUSTY SNO

The present invention relates to the field of metal oxides, and particularly to the manufacture of stannous oxide (SnO).

Various metals, such as tin, are used in the manufacture of electronic devices. For example, pure tin and tin alloys such as tin-lead, tin-bismuth, tin-silver, and tin-silver-copper, are used as solders on interconnect packages. Such metals are often deposited on an electronic device substrate by electroplating. Typically, tin electroplating baths comprise divalent tin ions, optionally ions of an alloying metal such as silver, copper, bismuth, and combinations thereof, an acid electrolyte, and optionally one or more of various organic additives. The organic additives are chosen to provide deposited tin layers having certain desired properties.

During the course of electroplating, the amount of tin (II) ions in solution decreases as the electroplating of tin deposits continues. A point is reached where the tin (II) ions in solution must be replenished and additional divalent tin salt is added to the plating bath. In the deposition of pure tin deposits, the exact concentration of tin (II) ions in the plating bath is less critical, provided there is sufficient tin to deposit a tin layer of a desired thickness. However, in the deposition of tin-alloys, such as tin-silver, tin-bismuth, tin-copper and tin-silver-copper, the concentration of tin ions in the plating bath can be critical to achieving the desired alloy composition. Accordingly, it is desired to provide a known concentration of tin (II) ions in the plating bath.

Tin electroplating baths are prepared using a source of divalent tin ions, which may be any suitable tin salt, such as tin alkane sulfonate. Such tin salts are typically prepared by dissolving stannous oxide (or tin (II) oxide) in a suitable acid to form the desired tin salt, which may be used as the source of divalent tin ions. Stannous oxide, which is typically provided as particles, may be dissolved in acidic tin electroplating baths directly, or may be dissolved in acid separately and then added to the plating bath as a divalent tin solution.

Over time, stannous oxide particles form at least a partial surface layer (or coating or crust) of stannic oxide (or tin (IV) oxide). It is very difficult to determine the exact amount of stannic oxide in a given amount of stannous oxide. Stannic oxide is relatively insoluble in acids, making it impractical for plating bath applications. Thus, when stannous oxide particles having at least a partial coating of stannic oxide are used to prepare a tin, and particularly a tin-alloy, plating bath, it is difficult to know the exact concentration of tin (II) ions in the bath. An additional problem is that the insoluble stannic oxide forms turbid solutions and must be removed from the solution, such as by filtration. This extra step of removing the unwanted, insoluble stannic oxide adds to the overall cost and filtering such highly acidic solutions causes added difficulties. There is a need to control or reduce the level of stannic oxide on the surface of stannous oxide particles.

Japanese published patent application JP 11-310415 A discloses a process for making stannous oxide by dissolving $SnCl_2$ in hydrochloric acid, neutralizing the solution with a mixture of ammonia water and ammonium bicarbonate where the neutralized solution has a pH of 6-10, followed by heating the neutralized solution at >50° C., and then treating the resulting stannous oxide with various organic materials such as L-ascorbic acid, gluconic acid, hydroxylamines, phenols, aldehydes and sodium nitrite to prevent surface oxidation to stannic oxide. The organic surface treatment materials may not be effective at preventing oxidation during prolonged storage and these organic materials may build up in a tin plating bath which may adversely affect the properties of the tin-containing deposit.

Drawdy et al., *Surface and Interface Analysis*, vol. 16, 369-374 (1990) disclose pretreating a platinized tin oxide catalyst with CO at various temperatures prior to using the catalyst in the production of $CO_2$ from CO. The platinized catalyst is 2% Pt in $SnO_2$, but tin hydroxides also appear to be present. Following this pretreatment, both metallic tin and metallic platinum are produced, as well as a tin-platinum alloy. That is, at least some of the tin (IV) oxide in the catalyst is fully reduced to tin metal. This article does not discuss producing stannous oxide and fails to recognize the need to only partially reduce the stannic oxide.

There remains a need to provide stannous oxide particles having a reduced level of stannic oxide content, even after prolonged storage, that can be used to prepare tin plating baths, and which do not impart undesired organic materials to a tin (II) ion-containing plating bath.

The present invention provides a method comprising: a) providing a plurality of stannous oxide particles, wherein at least a portion of the plurality of particles comprises a surface coating of stannic oxide; and b) treating the plurality of particles with a reducing agent for a period of time sufficient to reduce at least a portion of the stannic oxide coating to stannous oxide without substantially forming metallic tin.

Also provided by the present invention is a method of preparing an acidic tin plating bath comprising: a) providing a plurality of stannous oxide particles, wherein at least a portion of the plurality of particles comprises a surface coating of stannic oxide; b) treating the plurality of particles with a reducing agent for a period of time sufficient to reduce at least a portion of the stannic oxide coating to stannous oxide without substantially forming metallic tin; c) separating the reducing agent from the plurality of particles; and d) dissolving the treated particles in an acid.

The present invention further provides an apparatus suitable for the treatment of stannous oxide particles comprising: a vessel comprising a chamber for holding a plurality of stannous oxide particles to be treated with a reducing agent, the chamber being capable of being pressurized to at least 1000 kPa; the vessel having a fill port for introducing the plurality of stannous oxide particles in fluid communication with the chamber, a reducing agent inlet in fluid communication between a source of reducing agent and the chamber, a reducing agent outlet in fluid communication with the chamber, and an outlet for removing treated stannous oxide particles; and a means for heating the chamber to a temperature of ≥100° C.; wherein each of the reducing agent inlet and the reducing agent outlet optionally have a metering means; and wherein the reducing agent outlet optionally has a means for monitoring a level of oxidation of the reducing agent.

Figure 1:
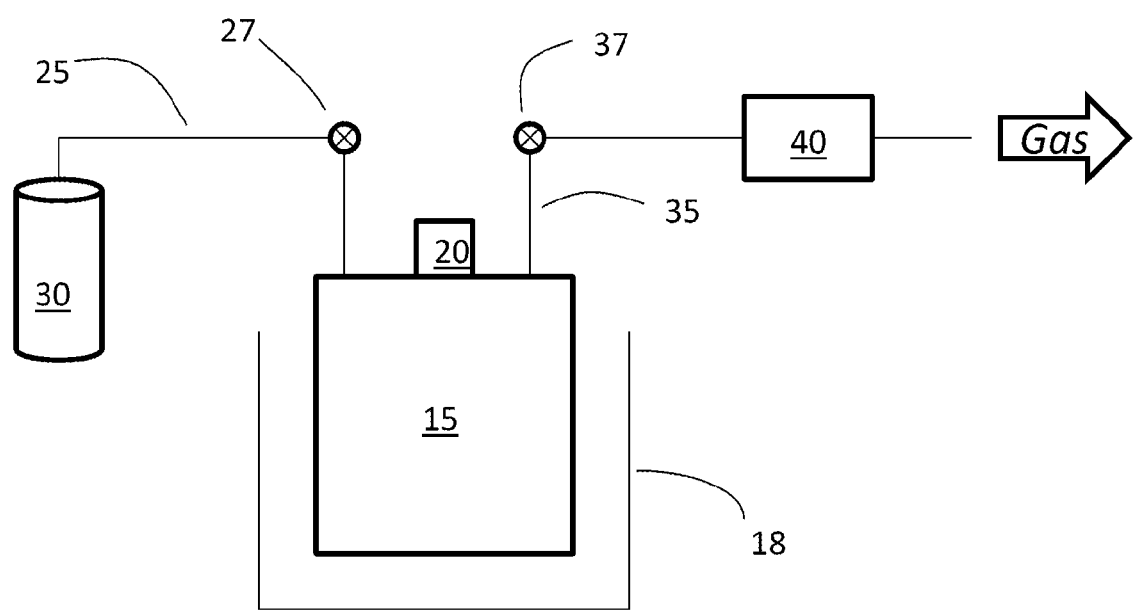
FIG. 1 is a schematic depiction of an apparatus suitable for use with the present method where a gaseous reducing agent is used.

In the Figures, like numerals refer to like elements. The articles "a" and "an" refer to the singular and the plural. Unless otherwise noted, all amounts are percentages by weight ("wt %") and all ratios are molar ratios. All numerical ranges are inclusive and combinable in any order except where it is clear that such numerical ranges are constrained to add up to 100%. The terms "alpha-particle emitters" and "alpha-particle emitting materials" are used interchangeably. As used herein, the term "substantially free of" an item means the material or composition contains less than 0.5% of that item. The following abbreviations have the following meanings:  ca.=about;  m=meters;  mm=millimeters;

μm=micrometer; nm=nanometer; Å=angstrom; ppm=parts per million; g=grams; mL=milliliters; wt %=percent by weight; A=amperes; V=volts; eV=electronvolts; keV=kilo eV; kPa=kilopascals; psi=pounds/inch$^2$; and ° C.=degrees Celsius.

Freshly prepared stannous oxide particles are generally readily soluble in acids, such as organosulfonic acids, and particularly methane sulfonic acid. Over time, the surface of stannous oxide particles will further oxidize to form stannic oxide (or tin (IV) oxide). Stannic oxide ($SnO_2$) is relatively insoluble in acid compared to stannous oxide. The formation of stannic oxide on the surface of the stannous oxide particles adversely affects the solubility of the material. Using such stannous oxide having a stannic oxide surface layer in the make-up or the replenishment of an acid tin electroplating bath results in insoluble material ($SnO_2$) which forms turbid solutions that need filtering to be useful, and provides unknown quantities of tin (II) ions in solution since not all of the stating stannous oxide material can be dissolved.

The present invention addresses this problem by selective partial reduction of stannic oxide in the presence of stannous oxide to lower the amount of stannic oxide on the surface of the stannous oxide particles, without substantially reducing stannous oxide to tin metal. In this way, the percentage of stannic oxide on the surface of a stannous oxide particle is lowered. As used herein, "partial reduction" refers to reducing a metal by one oxidation state, such as going from tin (IV) to tin (II). The phrase "without substantially reducing stannous oxide to tin metal" means that <1%, preferably ≤0.5%, more preferably ≤0.25%, still more preferable ≤0.1%, and even more preferably ≤0.05% of the total tin (II) ions are reduced to tin metal.

Stannic oxide of the surface of stannous oxide particles is reduced according to the method comprising: a) providing a plurality of stannous oxide particles, wherein at least a portion of the plurality of particles comprises a surface coating of stannic oxide; and b) treating the plurality of particles with a reducing agent for a period of time sufficient to reduce at least a portion of the stannic oxide coating to stannous oxide without substantially forming metallic tin.

Stannous oxide useful in the present process may be prepared by any suitable means and may have any suitable particle size and shape. Stannous oxide is conventionally prepared by dissolving tin metal in a mineral acid, such as hydrochloric acid, followed by neutralization with a base, such as sodium hydroxide or ammonia water/ammonium bicarbonate, and the resulting product is heated to form the desired tin (II) oxide. The resulting SnO may have a variety of morphologies, such as flakes, balls, discs, rods, and the like, as well as a variety of particle sizes, such as from 1 to 50 μm, although smaller and larger particles may also be suitably used. The presence of additional metals in the stannous oxide may adversely affect the reduction of stannic oxide to stannous oxide. For example, such additional metals may function to further catalyze reduction of tin (II) ions or may otherwise interfere with the reduction of tin (IV) to tin (II). Preferably, the stannous oxide used in the present invention is substantially free of platinum, and more preferably is free of platinum. It is further preferred that the stannous oxides particles are substantially free of noble metals (platinum, palladium, iridium, osmium, rhodium, ruthenium, silver and gold), and are more preferably free of noble metals. Even more preferred is stannous oxide substantially free of metals other than tin.

Some of the metals used in the manufacture of electronic devices may contain low levels of certain radioactive isotopes that emit alpha-particles ("alpha-particle emitters"). Examples of such radioactive isotopes include $^{210}$Pb, which is a member of the uranium decay chain, which is a main contributor of alpha particle emitters as impurities within bulk metal materials (e.g. silver and tin), as well as various common contaminants of lead, such as isotopes of uranium ($^{234,238}$U), thorium ($^{230}$Th), radium ($^{226}$Ra), radon ($^{222}$Rn), polonium ($^{210,218}$Po) and bismuth ($^{211,212}$Bi). Solders are commonly utilized in semiconductor device packaging to attach an integrated circuit ("IC") chip to a package or a substrate. If the solders attaching IC circuitry contain alpha-particle emitters, the alpha-particles are emitted in close proximity to the ICs and can cause damage to packaged semiconductor devices. Specifically, these emitted alpha-particles are capable of causing a change in electrical states, referred to as "soft errors." The errors are referred to as being "soft" because they are not permanent. However, these errors will typically cause at least one round of incorrect calculations. These soft errors are an increasingly large problem for integrated circuit chip fabricators. Accordingly, it is preferred that the stannous oxide particles have a low alpha-particle emitter content. The amount of alpha-particle emitters present in a metal is typically determined by an alpha flux measurement, with results stated in terms of alpha-particle counts per unit area (square centimeters) per hour (cts/cm$^2$/hr or cph/cm$^2$). Preferably, the plurality of stannous oxide particles has an alpha-particle emission (also termed an alpha flux) of ≤0.05 cts/cm$^2$/hr, and more preferably from 0.0001 to 0.02 cts/cm$^2$/hr.

The surface of the stannous oxide particles may be analyzed by any suitable method to determine the presence of stannic oxide. A particularly suitable method is X-ray photoelectron spectroscopy ("XPS") which can be used to quantitatively determine the amount of surface oxidation (to a depth of 10 nm). The Sn 3d 5/2 electron binding energy of stannic oxide ($SnO_2$) is slightly higher than that of SnO, 486.9 eV and 486.2 eV, respectively. The ratio of XPS signals at these binding energies is converted to a ratio of tin-to-oxygen (Sn: O), with $SnO_2$ having a value of 0.5 and SnO having a value of 1.0. The nearer the Sn:O ratio is to 1.0, the lower the amount of $SnO_2$ on the surface of the stannous oxide particles.

The reducing agent is selected such that it will reduce tin (IV) to tin (II) under the treatment conditions without substantially reducing stannous oxide to tin metal. Suitable reducing agents have a standard reduction potential ($E_h$) of <0.15 V. Preferred reducing agents have a standard reduction potential in the range of $-0.14 < E_h < 0.15$ V. Standard reduction potentials are determined using a standard hydrogen electrode. The reducing agents may be in either gaseous or liquid form, and preferably the reducing agent is a gas. Exemplary reducing gases are CO, $H_2$, and mixtures thereof. Mixtures of CO and $H_2$ are commercially available under the "syngas" designation. "Syngas" refers to various mixtures of CO and $H_2$, optionally including $CO_2$. CO and $H_2$ are preferred and CO is more preferred. Any such reducing gas may be further combined with one or more inert gases, such as argon, helium or nitrogen. Such inert gas may be used to further adjust the pressure during the reduction step. Exemplary liquid reducing agents include: silver nitrite; boronhydride; alkali metal thiosulfate salts such as sodium thiosulfate and potassium thuiosulfate; alkali metal hypophosphite salts such as sodium hypophosphite and potassium hypophosphite; and hypophosphorus acid Alkali metal thiosulfate salts are preferred, and sodium thiosulfate is more preferred. Such liquid reducing agents are typically in a liquid medium, such as water or other suitable solvent. When a gaseous reducing agent is used, the stannous oxide particles may be contacted with a static atmosphere of the reducing agent or a continuous flow of the reducing agent. When a liquid reducing agent is used, the stannous oxide particles may be contacted with a continuous flow of the liquid reducing agent, or, alternatively, may be contacted with the liquid reducing agent in a static manner, that is, the stannous oxide particles may be contacted with a non-moving liquid reducing agent.

The stannous oxide particles are contacted (or treated) with the reducing agent for a period of time sufficient to reduce at least a portion of the stannic oxide coating (or crust) to stannous oxide without substantially forming metallic tin. A wide variety of times may be used, such as from 0.5 to 24 hours, preferably from 1 to 20 hours, more preferably from 1 to 18 hours, still more preferably from 1 to 12 hours, and more preferably from 1 to 8 hours. The particular time will depend, in part, on the temperature and pressure used, the average particle size of the SnO particles, as well as the packing density of the SnO particles. As the temperature and pressure each increase, the contact time typically decreases. Smaller SnO particles have a greater proportion of surface area that can be oxidized to tin (IV) oxide than do larger SnO particles, and may require a longer contact time in order to sufficiently reduce the level of tin (IV) on the particle surface. The more densely packed the SnO particles, the more difficult it may be for the reducing agent to effectively reach all surfaces.

Stannous oxide particles may be contacted with the reducing agent at a variety of temperatures. Preferably, the stannous oxide is maintained at a temperature of ≥20° C., more preferably from 35 to 500° C., even more preferably from 50 to 350° C., and yet more preferably from 50 to 350° C. When the reducing agent is a gas, it is preferred that the temperature is ≥100° C., more preferably ≥125° C., even more preferably ≥150° C., yet more preferably ≥175° C., and still more preferably ≥200° C. A suitable range of temperatures is from 100 to 500° C., preferably from 125 to 500° C., and more preferably from 150 to 350° C. A particularly preferred temperature range is from 150 to 225° C. When the reducing agent is a liquid, a preferred temperature range is from 20 to 150° C., more preferably from 35 to 105° C., and still more preferably from 50 to 105° C. When a liquid reducing agent is used, it is preferred that the stannous oxide particles, reducing agent is heated, or the mixture thereof is heated.

When the reducing agent is a gas, it is preferred that the plurality of stannous oxide particles is treated with the reducing agent at a suitable pressure. A variety of pressures may be used, such as >700 kPa, and preferably from 700 kPa (ca. 100 psi) to 3500 kPa (ca. 510 psi) or greater. More preferably, the pressure is from 800 to 3500 kPa; even preferably from 1000 to 3500 kPa; still more preferably from 1350 to 3500 kPa, yet more preferably from 2000 to 3500 kPa, and most preferably from 2500 to 3500 kPa. It is particularly preferred that when a reducing gas is used, that the stannous oxide contact the reducing gas at a temperature in of from 150 to 300° C., at a pressure of 2500 to 3500 kPa, and for period of time from 1 to 8 hours. The stannous oxide particles may be contacted with the reducing gas under pressure in a closed (static) system, or, alternatively, a pressurized gas flow may be used. When a pressurized gas flow is used, it may have any suitable flow rate, such as from 1 to 230,000 sccm (standard cm$^3$/min.), and preferably from 1 to 30,000 sccm. A mixture of a reducing gas and an inert gas may be used.

FIG. 1 is a schematic drawing of an apparatus suitable for use in the present invention when a reducing gas, such as CO or $H_2$, is used. A plurality of stannous oxide particles, wherein at least a portion of the plurality of particles comprises a surface coating of stannic oxide, is placed in vessel 15 through optional port 20. Typically, vessel 15 is composed of any suitably unreactive material, such as INCONEL corrosion resistant alloys, stainless steels such as 304 or 316, quartz, and the like. Although port 20 is shown on the top of vessel 15, it may be located at any suitable position on vessel 15. Alternatively, vessel 15 may be composed of two pieces which are removably attached, and which may be disconnected to open vessel 15, into which stannous oxide could be added, in place of port 20. Vessel 15 may optionally be heated. FIG. 1 illustrates heating means 18 disposed around vessel 15. Heating means 18 may be a fluid bath, such as an oil bath. Reducing gas, such as CO, is supplied to vessel 15 from source 30 by way of inlet 25. Inlet 25 contains an optional metering means, valve 27. In operation, valve 27 is opened to allow the reducing gas to pass into vessel 15. The reducing gas exits vessel 15 by way of outlet 35, which contains an optional metering means, valve 37, and passes into monitoring means 40, which monitors the level of oxidation of the reducing agent. Valve 37 may be used to regulate the pressure within vessel 15. Outlet 35 may be located at any suitable position on vessel 15, but is typically located on an upper surface of the vessel. In the case of CO, the monitoring means determines the level of $CO_2$ in the CO gas stream exiting vessel 15. In the case of $H_2$, the monitoring means would detect $H_2O$ in the gas stream. A variety of commercially available detectors may be used as the monitoring means. As the level of $CO_2$ (or $H_2O$ when $H_2$ is used) starts to decrease, the reduction of the stannic oxide on the surface of the stannous oxide particles is nearing completion and the treatment can be stopped. Upon completion of the reduction step, the stannous oxide particles can be removed from vessel 15.

Figure 2A:
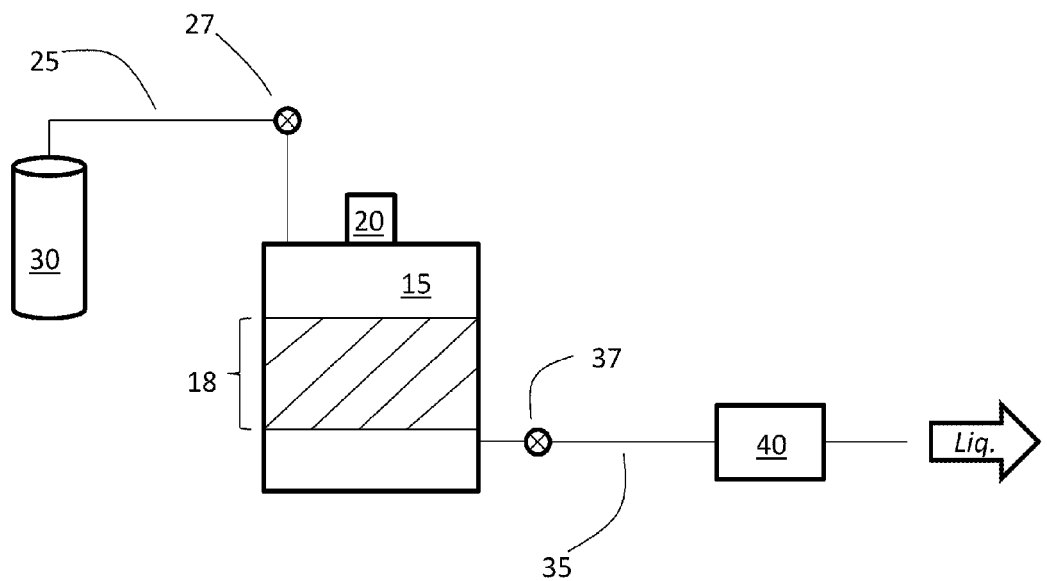
FIGS. 2A and 2B are schematic depictions of an apparatus suitable for use with the present method where a liquid reducing agent is used.

FIG. 2A is a schematic drawing of an apparatus suitable for use in the present invention when a liquid reducing agent is used. The apparatus in FIG. 2A is similar to that shown in FIG. 1, except that the outlet 35 is located on a lower portion of vessel 15, where it is easier to remove liquid reducing agent, and heating means 18 may be integral to vessel 15 or may be a heating tape, heating coil, or the like. In FIG. 2A, liquid reducing agent is conveyed from source 30 into vessel 15 by way of inlet 25. The stannous oxide particles may be contacted with a continuous flow of liquid reducing agent or the vessel may be filled with the liquid reducing agent and metering valve 37 may be closed to keep the liquid reducing agent in contact with the plurality of stannous oxide particles.

Figure 2B:
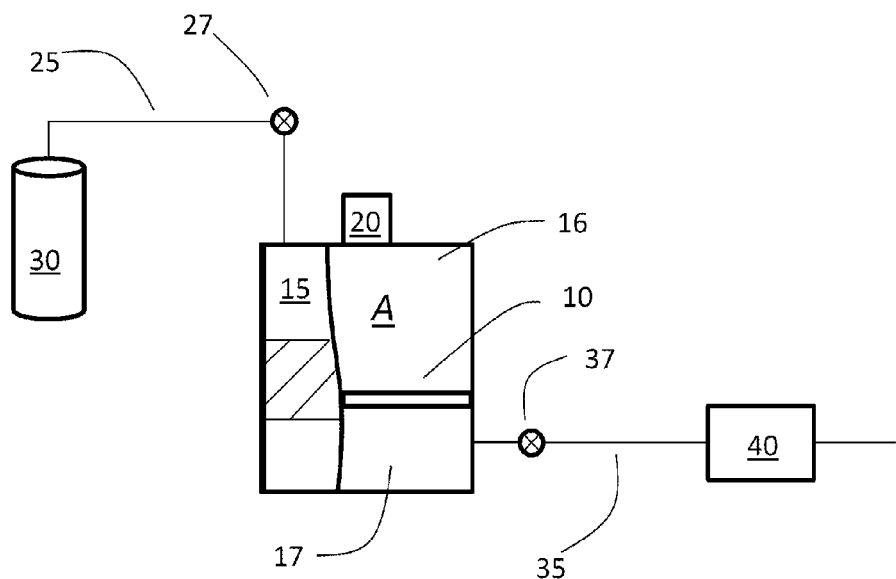

FIG. 2B is a schematic diagram showing cutaway A of vessel 15. The interior of vessel 15 contains a perforated means 10, such as a porous plate or wire mesh, separating the interior of vessel 15 into first portion 16 and second portion 17. Stannous oxide particles are added to first portion 16 and are disposed on perforated means 10. Liquid reducing agent then enters vessel 15 through inlet 25 and enters first portion 16, contacts the stannous oxide particles, and then passes through perforated means 10, enters second portion 17, and then exits vessel 15 through outlet 35. Valve 37 may be used to regulate the level of reducing agent in vessel 15.

Alternatively, the stannous oxide particles may be disposed within a "tea-bag", such as a stainless-steel wire mesh bag, and placed in a vessel and contacted with the reducing agent. A gaseous or liquid reducing agent may be contacted with the stannous oxide particles in the "tea-bag" or the "tea-bag" may be immersed in a vessel containing a liquid reducing agent. Contact between the stannous oxide and the reducing agent will occur for a period of time sufficient to reduce at least a portion of the stannic oxide coating to stannous oxide without substantially forming metallic tin. The temperature and pressure used with this "tea-bag" are selected as described above and are sufficient to reduce at least a portion of the stannic oxide coating to stannous oxide.

Following contact for a sufficient time, the stannous oxide particles are separated from the reducing agent. When a gaseous reducing agent is used, such separation can be achieved simply by stopping the flow of reducing gas or purging the treatment vessel of the reducing gas. When a liquid reducing agent is used, such separation may be effected by draining the liquid reducing agent from the vessel, such as that shown in FIGS. 2A and 2B, or by removing the "tea-bag" containing the stannous oxide particles from the vessel containing the liquid reducing agent.

If the treated stannous oxide of the present invention is not to be immediately used, it is preferred that it is packaged in a material that has a very low oxygen permeability. It is preferred that the packaging material has an oxygen permeability of <100 $cm^3$/645 $cm^2 \cdot 24$ hr (or <100 $cm^3$/100 $in^2 \cdot 24$ hr). Suitable material includes: polyethylene terephthalate ("PET") including biaxially-oriented polyethylene terephthalate; poly(methylmethacrylate); polyvinylidene fluoride; and metallized polymers such as metallized polyethylene terephthalate, metallized nylon, metallized polyethylene and metallized polypropylene. Metals typically used in metallized polymers include, but are not limited to, aluminum, nickel, chromium and gold. It is preferred that when a metallized polymer is used as a packaging material, that it be used as the outer packaging material in a multi-layer packaging system, and that the stannous oxide is first packaged in a non-metallized polymer, such PET or high density polyethylene. That is, packaged stannous oxide is then placed within the metallized polymer package to reduce the possibility of metal leaching into the stannous oxide from the metallized polymer. Preferred materials are polyethylene terephthalate, poly(methylmethacrylate), polyvinylidene fluoride, and metallized polyethylene terephthalate. Preferably, the stannous oxide of the present invention is packaged in an atmosphere that is substantially free of oxygen, and is preferably free of oxygen. Suitable packages include bags, bottles and ampoules.

The stannous oxide of the invention is particularly useful in the preparation of tin electroplating baths, and more preferably in the preparation and replenishment of tin-alloy electroplating baths, such as tin-silver, tin-bismuth, tin-copper and tin-silver-copper electroplating baths. When low alpha-particle emitting tin oxide is used, the resulting plurality of stannous oxide particles having reduced surface coating of stannic oxide is also low alpha-particle emitting. Preferably, the plurality of stannous oxide particles has an alpha-particle emission of ≤0.05 cph/$cm^2$.

Accordingly, the present invention provides a method of preparing an acidic tin plating bath comprising: a) providing a plurality of stannous oxide particles, wherein at least a portion of the plurality of particles comprises a surface coating of stannic oxide; b) treating the plurality of particles with a reducing agent for a period of time sufficient to reduce at least a portion of the stannic oxide coating to stannous oxide without substantially forming metallic tin; c) separating the reducing agent from the plurality of particles; and d) dissolving the treated particles in an acid. Any acid useful as an electrolyte in a tin-containing electroplating bath may be used. Exemplary acids are: sulfuric acid, fluoroboric acid, and organosulfonic acids such as alkanesulfonic acid and arylsulfonic acids. Organosulfonic acids are preferred. Exemplary organosulfonic acids are methanesulfonic acid, ethanesulfonic acid, propanesulfonic acid, phenylsulfonic acid, phenolsulfonic acid, toluenesulfonic acid, and cresolsulfonic acid.

EXAMPLES

The following general procedures were used.
Energy-Dispersive X-Ray Spectroscopy (EDS) Analysis:
Element spectra and maps were acquired using a Bruker 4030 XFlash (serial #1873) silicon drift energy dispersive X-ray spectrometer (EDS), at 10 keV for 30 seconds each spectrum and 5 minutes each map. Results were normalized to 100%. The detection limit is typically ca. 0.5 wt % range.
X-Ray Photoelectron Spectroscopy (XPS) Analysis:
A Kratos AXIS HSi S/N 332272/01 X-ray photoelectron spectrometer equipped with a monochromatic Al Kα 225 Watt (14 kV, 15 mA) X-ray source was used to acquire XPS data. The analyzer pass energy was set at 80 eV for qualitative survey spectra an 20 eV for high resolution spectra. The take-off angle was 90° and a magnetic lens mode was used. The aperture slot was set for 3×10 mm with an iris of 5 turns. The analysis area was set for 400×600 μm. The flood gun conditions were set for a filament current of 1.60-1.65 A and a charge balance of 2.25 V.
Gas Chromatography Headspace Analysis:
An Agilent 6890 gas chromatograph was used for this analysis. The GC columns used for the analysis were Varian MoleSieve 5A (50 m×0.53 mm, 50 μm thickness) and Varian Poraplot U (25 m×0.32 mm, 10 μm thickness). Gas chromatography was performed using the following gas standards: Air-Liquide cylinder (5% oxygen, 5% methane, 5% carbon monoxide, 4% carbon dioxide, 4% hydrogen, 4% nitrogen, and helium balance) and Airgas cylinder (2% argon, 40% hydrogen, 5% nitrogen, 6% carbon dioxide, 40% carbon monoxide, 3% methane, 5000 ppm ethane, and helium balance). Injections were repeated 3-4 times for each standard. Good precision and linearity were observed from the resulting calibration.
Powder X-Ray Diffraction ("XD") Analysis:
A Bruker D-8 Advance θ-θ X-ray diffractometer, equipped with a copper sealed-tube source and a Vantec-1 linear position sensitive detector, was used for collecting X-ray diffraction patterns. The tube was operated at 30 kV and 50 mA and the samples were illuminated with copper K-alpha radiation (wavelength=1.541 Å). XRD data were collected from 5 to 110° (2θ) with a scan rate of 1.02°/minute and a detector window of 6°. Analysis of the resulting X-ray diffraction patterns was performed using JADE X-ray pattern analysis software V9.1. Whole pattern fitting between 5° and 110° was carried out to quantify phases in the patterns.

Example 1

Preparation of Fresh Stannous Oxide (SnO)

To a jacketed, bottom drain glass reactor equipped with an overhead mechanical agitator (glass shaft and impellor, 45 PBT blade), reflux condenser, active nitrogen sweep, and caustic scrubber (10% NaOH) was charged 100 g of granular tin metal, 340 g of water, and 462 g of concentrated HCl (aqueous, 37%). The heterogeneous mixture was heated to 110° C. and vigorously agitated until the solid was completed dissolved. The solution was cooled to ambient temperature and then charged with a saturated solution of aqueous sodium carbonate (605 g $Na_2CO_3$ and 2700 g of $H_2O$) that was prepared in a separate flask. The resulting milky-white solution was heated to 100° C. and allowed to stir for 3 hours before cooling to ambient temperature. The resulting crude, blue-black product mixture was drained from the reactor. The desired product was collected by vacuum filtering the product mixture through a medium porosity glass frit filter and washed with an equal volume of 18 mΩ H₂O (5×). The wet cake was transferred to a dry tray and dried inside an inert atmosphere drying oven set at 70° C. for 12 hours. The desired SnO product was analyzed by XRD for compositional confirmation.

Example 2

High resolution XPS was used to investigate the surface character of various stannous oxide samples. The XPS data for the SnO particles prepared in Example 1 (Sample 1) and for commercially available SnO particles having a low alpha-particle emitter content (Sample 2) were compared to standards of SnO and $SnO_2$ (from Sigma-Aldrich). As expected, the $SnO_2$ standard was found to have a 3d 5/2 electron binding energy of 486.9 eV which is in good agreement to literature values. Initial results from the SnO standard indicated that the 3d 5/s electron binding energy was identical to that of the $SnO_2$, indicating substantial surface oxidation. Sample 2 had an XPS profile that was nearly identical to that of the $SnO_2$ standard, whereas Sample 1 had an XPS profile that was notably different from the other samples with a SnO 3d 5/s binding energy of 486.2 eV which matched well with the reported literature value for SnO.

The relative chemical composition of the tin species on the surfaces of the stannous oxide particles were determined by averaging their signal intensities at the literature value corresponding to the atomic electron binding energies of that element. The ideal ratios of Sn:O for SnO and $SnO_2$ are 1.0 and 0.5, respectively. The data reported in Table 1 indicate that all of the SnO samples are not close to the ideal value of 0.5, indicative of large amounts of $SnO_2$ on the surface; but the freshly prepared SnO particles (Sample 1) had the largest Sn:O value of 0.7 indicating the lowest amount of surface $SnO_2$.

TABLE 1

| Sample | O 1s % | Sn 3d % | Sn:O |
|---|---|---|---|
| SnO Standard | 51.9 (0.4) | 26.6 (0.9) | 0.5 |
| SnO₂ Standard | 54.9 (0.5) | 31.2 (0.3) | 0.6 |
| 1 | 46.4 (0.9) | 32.7 (1.1) | 0.7 |
| 2 | 50.5 (1.0) | 28.8 (0.3) | 0.6 |

Example 3

SnO particles were again prepared following the general procedure of Example 1, and following drying under an inert atmosphere were split into two fractions. One fraction was stored in a glass scintillation vial on a bench-top with no purging of the headspace within the vial to remove atmospheric oxygen. The second fraction was stored in a glass scintillation vial that was purged with nitrogen prior to charging with the SnO particles, and after the SnO particles were loaded was purged again before closing the vial with a sealable polytetrafluoroethylene cap, which was then wrapped with paraffin film. These two samples were labeled "Sample 3" and "Sample 4", respectively, and allowed to age over the course of a month. At the end of the month, two fresh samples, Samples 5 and 6, were prepared in the same fashion. Sample 5 was placed in a glass scintillation vial under ambient oxygen, while Sample 6 was placed in a glass vial under $N_2$. The four samples were analyzed by XPS to determine the effect of storage under ambient and inert atmospheres. The XPS data showed that the SnO stored within an inert atmosphere experienced less surface oxidation than the SnO stored within an ambient atmosphere. Even SnO particles stored in an inerted vial (Sample 4) showed significant surface oxidation over the course of a month's storage. These data are shown in Table 2.

TABLE 2

| Sample | O 1s % | Sn 3d % | Sn:O |
|---|---|---|---|
| 3 | 47.3 (1.3) | 29.3 (0.3) | 0.6 |
| 4 | 48.4 (1.2) | 28.3 (0.9) | 0.6 |
| 5 | 45.3 (1.1) | 31.8 (0.7) | 0.7 |
| 6 | 41.9 (1.3) | 32.7 (0.4) | 0.8 |

Example 4

Various SnO samples (shown below) were contacted with a reducing agent according to the following general procedure. To a J-tube stainless steel (316SS) reactor equipped with pressure gauge and needle valve inlet and outlet ports was charged 10 g of SnO sample. The reactor was sealed, purged with CO, and pressure checked to 3450 kPa (500 psi) CO before pressurizing to the desired pressure of CO. The reactor was then submerged within a hot oil bath at the desired temperature and allowed to incubate for the desired reaction duration. The reactor was then removed from the hot oil bath and allowed to cool to ambient temperature. The reaction headspace was carefully collected within a GC grab bag for further analysis. The SnO was poured from the reactor and then analyzed for SnO-MSA plating bath reactivity and surface composition by XPS.

Following the above reduction, the treated SnO samples were evaluated for their solubility in an acid electrolyte according to the following general procedure. To a glass scintillation vial equipped with magnetic stir bar was charged 1.2 g of mΩ H₂O and 8.1 g of 70 wt % methanesulfonic acid ("MSA"). The solution was allowed to properly mix over the course of 2 minutes with vigorous agitation and then the solution was charged with 3.59 g of a treated SnO sample while being vigorously agitated. The solution was monitored for time of complete dissolution, final solution color, and final solution clarity.

The data are reported in Table 3. Samples 7-12 were commercially available SnO samples, all from the same source, and sample 13 was an SnO sample prepared according to Example 1. The SnO-MSA samples were visually inspected for turbidity and color. It is preferred that the SnO-MSA samples show no turbidity. The color of the SnO-MSA is indicative of the level of solubility of the SnO in the MSA, with the lightest color indicating the greatest solubility, and therefore the lowest level of $SnO_2$. Darker color is signified by "+" and the lightest color is signified by "++++".

TABLE 3

| Sample | Pressure (kPa) | Temperature (° C.) | Duration (hr) | SnO-MSA Turbidity | SnO-MSA Color |
|---|---|---|---|---|---|
| 7 | 690 | 100 | 1 | Yes | + |
| 8 | 1375 | 100 | 1 | Yes | + |
| 9 | 2760 | 100 | 1 | Yes | + |
| 10 | 2760 | 150 | 2 | Yes | ++ |
| 11 | 2760 | 200 | 3 | Yes | +++ |
| 12 | 3450 | 220 | 4 | Yes | +++ |
| 13 | 3450 | 220 | 1 | No | ++++ |

The data clearly indicate that samples 10-13 show a greater solubility in MSA, and therefore have a lower amount of $SnO_2$ on the particle surface.

Example 5

Bulk SnO (1000 g) is loaded into a nitrogen blanketed filter crucible/vessel located above a removable filtrate trap. The filter crucible/vessel is then charged with 1 L of 9.9 mM silver nitrite solution (prepared from 1.5 g of silver nitrite dissolved in 1 L of water). The mixture is vigorously stirred and heated at a temperature of 50 to 105° C. for the desired amount of time. The liquid is then removed by filtration or decantation while maintaining an inert gas blanket over the wet cake. The wet cake is washed with 1 L of purified (i.e. de-ionized and organic impurity free) water and the liquid is removed by filtration or decantation while maintaining an inert gas blanket over the wet cake. A plurality SnO particles having a reduced level of $SnO_2$ on the surface of the particle as compared to the bulk SnO material is expected.

Example 6

The general procedure of Example 5 is repeated except that 5 kg of bulk SnO is used and the filter crucible/vessel is charged with 5 L of 9.9 mM sodium thiosulfate solution (prepared from 7.8 g of sodium thiosulfate dissolved in 5 L of water). A plurality SnO particles having a reduced level of $SnO_2$ on the surface of the particle as compared to the bulk SnO material is expected.

Example 7

A plurality of SnO particles is contacted with CO according to the general procedure of Example 4. Following the reduction step, the SnO particles are collected under inert atmosphere ($N_2$) and transferred to a dry box for packaging within a high density polyethylene bottle and then heat-sealed within a metallized polyethylene terephthalate bag.

What is claimed is:

1. A method comprising: a) providing a plurality of stannous oxide particles, wherein at least a portion of the plurality of particles comprises a surface coating of stannic oxide; and b) treating the plurality of particles with a reducing agent for a period of time sufficient to reduce at least a portion of the stannic oxide coating to stannous oxide without substantially reducing stannous oxide to tin metal; and c) placing the treated plurality of stannous oxide particles in a packaging material having an oxygen permeability of <100 $cm^3$/645$cm^2$×24hr.

2. The method of claim 1 wherein the plurality of particles is substantially free of platinum.

3. The method of claim 1 wherein the reducing agent has a reduction potential ($E_{f_h}$) of <0.15 V.

4. The method of claim 1 wherein the reducing agent is a gas.

5. The method of claim 4 wherein the reducing agent comprises a gas selected from the group consisting of CO, $H_2$, and mixtures thereof.

6. The method of claim 1 wherein the reducing agent is a liquid.

7. The method of claim 6 wherein the reducing agent is selected from the group consisting of silver nitrite, boronhydride, alkali metal thiosulfate salts, alkali metal hypophosphite salts, and hypophosphorus acid.

8. The method of claim 1 wherein <1% of total tin (II) ions are reduced to tin metal.

9. The method of claim 8 wherein ≤0.5% of total tin (II) ions are reduced to tin metal.

10. The method of claim 1 wherein the packaging material is selected from the group consisting of polythylene terephthalate, poly(methylmethacrylate), polyvinylidene fluoride, and metallized polymers.

11. The method of claim 1 wherein the plurality of stannous oxide particles has an alpha-particle emission of ≤0.05 cph/$cm^2$.

12. A method of preparing an acidic tin plating bath comprising a) providing a plurality of stannous oxide particles, wherein at least a portion of the plurality of particles comprises a surface coating of stannic oxide; b) treating the plurality of particles with a reducing agent for a period of time sufficient to reduce at least a portion of the stannic oxide coating to stannous oxide without substantially reducing stannous oxide to tin metal; c) separating the reducing agent from the treated plurality of particles; and d) dissolving the treated plurality of particles in an acid.

13. The method of claim 12 wherein the acid is an organosulfonic acid.

14. The method of claim 12 wherein in the treated plurality of stannous oxide particles <1% of total tin (II) ions are reduced to tin metal.

15. The method of claim 14 wherein <0.5% of total tin (II) ions are reduced to tin metal.

16. The method of claim 12 further comprising the step of placing the treated plurality of stannous oxide particles in a packaging material having an oxygen permeability of <100 $cm^3$/645 $cm^2$×24hr after step c) and before step d).

17. The method of claim 16 wherein the packaging material is selected from polyethylene terephthalate, poly(methylmethacrylate), polyvinylidene fluoride, and metallized polymers.

18. The method of claim 12 wherein the plurality of stannous oxide particles has an alpha-particle emission of ≤0.05 cph/$cm^2$.

* * * * *